United States Patent [19]

Sublett

[11] 4,233,196
[45] Nov. 11, 1980

[54] POLYESTER AND POLYESTERAMIDE COMPOSITIONS

[75] Inventor: Bobby J. Sublett, Kingsport, Tenn.

[73] Assignee: Eastman Kodak Company, Rochester, N.Y.

[21] Appl. No.: 34,226

[22] Filed: Apr. 30, 1979

[51] Int. Cl.$^3$ .................. C08J 3/02; C08G 63/68
[52] U.S. Cl. .................. 260/29.2 N; 260/29.2 E; 428/288; 428/423.1; 528/293; 528/295; 528/300; 528/301
[58] Field of Search .............. 260/29.2 E, 29.2 N; 528/288, 290, 291, 292, 293, 295, 300, 301; 428/423

[56] References Cited

U.S. PATENT DOCUMENTS

| | | | |
|---|---|---|---|
| 4,018,736 | 4/1977 | Fabian et al. | 260/29.2 N |
| 4,052,368 | 10/1977 | Larson | 528/293 |
| 4,104,262 | 8/1978 | Schade | 528/295 |
| 4,116,941 | 9/1978 | Hanson | 260/29.2 N |
| 4,130,520 | 12/1978 | Thomas et al. | 260/29.2 N |
| 4,148,779 | 4/1979 | Blackwell et al. | 260/40 R |

*Primary Examiner*—Lucille M. Phynes
*Attorney, Agent, or Firm*—John F. Stevens; Daniel B. Reece, III

[57] ABSTRACT

Composition comprising a linear, water-dissipatable polymer having an inherent viscosity of at least about 0.1 and comprising the reaction products of the following components or ester forming or esteramide forming derivatives thereof;

(a) at least one dicarboxylic acid;
(b) at least one difunctional sulfomonomer containing at least one metal sulfonate group attached to an aromatic nucleus wherein the functional groups are hydroxy, carboxyl or amino; and
(c) a glycol or a mixture of a glycol and diamine having two —NRH groups, the glycol containing two —CH$_2$—OH groups of which from about 0.1 to less than 15 mole percent based on the total mole percent of hydroxy or hydroxy and amino equivalents, is a poly(ethylene glycol) having the structural formula:

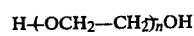

$H+OCH_2-CH_2\overline{)_n}OH$ n being an integer of between 2 and about 500, with the proviso that the mole percent of said poly(ethylene glycol) within said range is inversely proportional to the quantity of n within said range. The reaction components may also include one or more difunctional reactants selected from a hydroxycarboxylic acid having one —CR$_2$—OH, an aminocarboxylic acid having one —NRH group, an aminoalcohol having one —CR$_2$OH group and one —NRH or mixtures thereof, wherein each R is an H atom or an alkyl group of 1 to 4 carbon atoms.

14 Claims, No Drawings

POLYESTER AND POLYESTERAMIDE COMPOSITIONS

BACKGROUND OF THE INVENTION

1. Field of the Invention

This invention relates to water-dissipatable polyesters and polyesteramides containing ether groups and sulfonate groups in the form of a metal salt. Such polymers are useful as textile sizing materials, adhesives, coating materials, films, packaging materials and other products which can be dissolved, dispersed or otherwise dissipated in cold water, hot water, or aqueous solutions.

2. Description of the Prior Art

U.S. Pat. Nos. 3,779,993; 3,734,874 and 3,546,008, the disclosures of which are incorporated herein by reference, respectively relate to (1) compositions comprising, (2) aqueous dissipations of, and (3) fibrous articles sized with a polymer described as a linear, water-dissipatable, meltable polyester or polyesteramide, having an inherent viscosity of at least 0.1 and preferably (in some cases) at least 0.3, prepared from a glycol component, a dicarboxylic acid component, and a difunctional monomer component. The components used in the polymer condensation products are all essentially difunctional.

These patents disclose a linear, water-dissipatable polymer having carbonyloxy interconnecting groups in the linear molecular structure wherein up to 80% thereof may be carbonylamido linking groups, the polymers consisting essentially of the following components:

(a) At least one difunctional dicarboxylic acid;

(b) At least one difunctional glycol containing two —CR$_2$—OH groups of which at least 15 mole percent is a poly(ethylene glycol) having the structural formula:

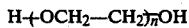

n being an integer in the range between about 2 and about 20;

(c) An amount sufficient to provide said water-dissipatable characteristic of said polymer of at least one difunctional sulfo-monomer containing at least one metal sulfonate group attached to an aromatic nucleus wherein the functional groups are hydroxy, carboxyl or amino; and (d) From none to an amount of a difunctional hydroxycarboxylic acid having one —CR$_2$—OH group, an aminocarboxylic acid having one —NRH group, an aminoalcohol having one —CR$_2$—OH group and one —NRH group, a diamine having two —NRH groups, or a mixture thereof, wherein each R is an H atom or a 1-4 carbon alkyl group, said components (a), (b), (c) and (d) being organic compounds, each of which contains a hydrocarbon moiety which has from none up to six nonfunctional groups.

These patents contain no teaching or suggestion of the difuntional glycol component containing less than 15 mole percent of the poly(ethylene glycol), or n being an integer greater than about 20.

SUMMARY OF THE INVENTION

The present invention provides a composition comprising a linear, water-dissipatable polymer having an inherent viscosity of at least about 0.1, the polymer containing substantially equimolar proportions of acid equivalents (100 mole percent) to hydroxy and amino equivalents (100 mole percent). The polymer is formed from at least one dicarboxylic acid, a difunctional sulfomonomer containing at least one metal sulfonate group attached to an aromatic nucleus wherein the functional groups are hydroxy, carboxyl or amino, and a glycol component at least part of which is a polyethylene glycol. The reactants may also comprise a hydroxycarboxylic acid, an aminocarboxylic acid, an aminoalcohol, or mixtures thereof. The invention permits the use of small quantities of high molecular weight polyethylene glycols.

DETAILED DESCRIPTION OF THE INVENTION

In accordance with the present invention, water dissipatable polyester and polyesteramide compositions having carbonyloxy interconnecting groups in the linear molecular structure wherein up to 80% thereof may be carbonylamido linking groups, the polymer having an inherent viscosity of at least about 0.1, and the polymer consisting essentially of the following components or ester forming or ester-amide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal sulfonate group attached to an aromatic nucleus wherein the functional groups are hydroxy, carboxyl or amino; and (c) at least one difunctional reactant selected from a glycol or a mixture of a glycol and diamine having two —NRH groups, the glycol containing two —CH$_2$—OH groups of which from about 0.1 to less than 15 mole percent based on the total mole percent of hydroxy or hydroxy and amino equivalents, is a poly(ethylene glycol) having the structural formula:

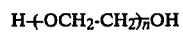

n being an integer of between 2 and about 500, with the proviso that the mole percent of said poly(ethylene glycol) within said range is inversely proportional to the quantity of n within said range. Solubility is related to the weight percent of poly(ethylene glycol) and mole percent of sulfomonomer. Therefore, if the content of either is relatively low, the other should be relatively high to maintain adequate solubility.

The polymer may contain at least one difunctional reactant selected from a hydroxycaroxylic acid having one —CR$_2$—OH, an aminocarboxylic acid having one —NRH group, an amino-alcohol having one —CR$_2$—OH group and one —NRH or mixtures thereof, wherein each R is an H atom or an alkyl group of 1 to 4 carbon atoms.

The values of n and the mole percent of poly(ethylene glycol) are adjusted such that the mole percent of poly(ethylene glycol) within the stated range is inversely proportional to the quantity of n within the stated ranges. Thus, when the mole percent is high (approaching 15) the value of n is low (around 2). On the other hand, if the mole percent is low (around 0.1), the value of n is high (about 450-500). It is apparent, therefore, that the weight percent (product of mole percent and molecular weight) of the poly(ethylene glycol) is a very important consideration because the water dissipatability of the copolyester decreases as the weight percent poly(ethylene glycol) in the copolyester decreases. For example, if the weight percent of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

According to one aspect of this invention, there is provided a polyester wherein the sulfo-monomer is dicarboxylic acid and constitutes about 8 to about 50 mole percent, preferably about 10 to about 50 mole percent, based on the sum of (1) the moles of the total dicarboxylic acid content of components (a) and (b), and (2) one-half of the moles of any hydroxycarboxylic acid.

According to another aspect of the invention, polyesters are provided wherein the sulfomonomer is a glycol and constitutes about 8 mole percent to about 50 mole percent based on the sum of the total glycol content measured in moles of (b) and (c), and one-half of the moles of any hydroxycarboxylic acid.

Examples of suitable poly(ethylene glycols) include relatively high moleculr weight polyethylene glycols, some of which are available commercially under the designation "Carbowax", a product of Union Carbide. Poly(ethylene glycols) having molecular weights of from about 500 to about 5000 are especially suitable.

The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; fumaric; maleic; itaconic; 1,4-cyclohexanedicarboxylic; phthalic; terephthalic and isophthalic. If terephthalic acid is used as the dicarboxylic acid component of the polyester, superior results are achieved when at least 5 mole percent of one of the other acids is also used.

It should be understood that use of the corresponding acid anhydrides, esters, and acid chlorides of these acids is included in the term "dicarboxylic acid".

Other suitable acids are disclosed in U.S. Pat. No. 3,779,993.

The difunctional sulfo-monomer component of the polyester or polyesteramide may advantageously be a dicarboxylic acid or ester thereof containing a metal sulfonate group or a glycol containing a metal sulfonate group or a hydroxy acid containing metal sulfonate group. The metal ion of the sulfonate salt may be $Na^+$, $Li^+$, $Mg^{++}$, $Ca^{++}$, $Cu^{++}$, $Ni^{++}$, $Fe^{++}$, $Fe^{+++}$ and the like. When a monovalent alkali metal ion is used the resulting polyesters or polyesteramides are less readily dissipated by cold water and more readily dissipated by hot water. When a divalent or a trivalent metal ion is used the resulting polyesters or polyesteramides are not ordinarily easily dissipated by cold water but are more readily dissipated in hot water. Depending on the end use of the polymer, either of the different sets of properties may be desirable. It is possible to prepare the polyester or polyesteramide using, for example, a sodium sulfonate salt and later by ion-exchange replace this ion with a different ion, for example, calcium, and thus alter the characteristics of the polymer. In general, this procedure is superior to preparing the polymer with divalent metal salts inasmuch as the sodium salts are usually more soluble in the polymer manufacturing components than are the divalent metal salts. Polymers containing divalent or trivalent metal ions are less elastic and rubber-like than polymers containing monovalent ions. The difunctional monomer component may also be referred to as a difunctional sulfomonomer and is further described hereinbelow.

Advantageous difunctional components which are aminoalcohols include aromatic, aliphatic, heterocyclic and other types as in regard to component (d). Specific examples include 5-aminopentanol-1,4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$CR_2$—OH group.

Advantageous difunctional monomer components which are aminocarboxylic acids include aromatic, aliphatic, heterocyclic, and other types as in regard to component (d) and include lactams. Specific examples include 6-aminocaproic acid, its lactam known as caprolactam, omega aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine, 4,7-dioxadecane-1,10-diamine; 1,4-cyclohexanebismethylamine; 1,3-cyclohexanebismethtylamine; heptamethylenediamine; dodecamethylenediamine, etc.

Advantageous difunctional sulfo-monomer components are those wherein the sulfonate salt group is attached to an aromatic acid nucleus such as a benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Other advantageous sulfo-monomer components include alkali metal salts of a sulfodiphenyl ether dicarboxylic acid or its ester as described in Defensive Publication 868 O.G. 730 published Nov. 18, 1969.

Particularly superior results are achieved when the difunctional sulfo-monomer component is 5-sodiosulfoisophthalic acid or its esters.

When the sulfonate-containing difunctional monomer is an acid or its ester, the polyester or polyesteramide should contain at least 8 mole percent of said monomer based on total acid content, with more than 10 mole percent giving particularly advantageous results. Total acid content is calculated as the sum of (1) moles of component (a) namely, dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

When the sulfomonomer is a glycol containing a metal sulfonate group, the polyester or polyesteramide should contain at least 8 mole percent of the sulfomonomer based on total hydroxy content and any amino content from a monomer component, with more than 10 mole percent giving particularly advantageous results. Total hydroxy and amino content from monomer components obviously excludes the oxy atoms internally present in the poly(ethylene glycol) and is calculated as the sum of (1) moles of component (b), (2) one-half of the moles of any carboxyl-containing compounds of component (d), (3) any moles of component (d) which are amino-alcohols and diamines, (4) one-half of the moles of component (c) which are mono-hydroxy or mono-amino containing compounds, and (5) moles of component (c) which are dihydroxy, diamino and aminohydroxy compounds.

Greater dissipatability is acieved when the difunctional sulfomonomer constitutes from about 5 mole percent to about 25 mole percent out of a total of 200 mole percent of (a), (b), (c) and any (d) components of the polyester or polyesteramide. The total of 200 mole percent is explained below and can also be referred to as 200 mole parts.

By changing the proportions of the various acids which make up the dicarboxylic acid component of the polyester or polyesteramide, the properties of the polymer may be varied to meet specific end uses. Therefore, as the proportion of terephthalic acid is decreased, the polymer becomes more flexible. Thus, wide ranges of softening point and flexibility can be obtained by varying the proportions of the various acids employed as the dicarboxylic acid component. Moreover, varying the mole percentages of sulfonate-containing difunctional monomer varies the water susceptibility of the polymer. In addition, the mixture of dissipated polymer and aqueous solution is unexpectedly stable, thus demonstrating the hydrolytic stability of the polymer. Furthermore, essentially no hydrolysis of the polymer occurs during three months storage at room temperature in water and even at 50° C. in water the polymer resists hydrolytic degradation for several days.

To obtain the modified polymers of this invention, the sulfonate-containing difunctional monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange reactions as well as polymerization or build-up processes.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight. In addition, whenever the terms "dissipatable," "dissipated" or "dissipate" are used in this description, it will be understood to refer to the activity of a water, aqueous or caustic aqueous solution on the polymer. The terms are specifically intended to cover those situations wherein the solution dissolves and/or disperses the polyester or polyesteramide therein and/or therethrough. Furthermore, whenever the word "water" is used in this description, it includes not only aqueous solutions but also hot aqueous solutions and caustic aqueous solutions.

The polyesters and polyesteramides of this invention have particular utility in textile sizes and in the paper-using industry as a hot-melt adhesive which will dissipate in aqueous or caustic aqueous solutions. In many operations using paper products, it is advantageous to use a hot-melt adhesive for various sealing or fastening operations as, for example, in making paper bags or in bookbinding. Such operations produce a significant amount of scrap paper which can be recovered by repulping and adding this pulp back in the paper-making process. Conventional hot-melt adhesives are not affected by the hot alkaline solutions used in repulping and seriously interfere with successful recovery of paper scrap.

The present invention, however, provides hot-melt adhesives which are dissolved or dispersed by hot aqueous solutions, and, therefore, do not interfere with the repulping process. Many other uses exist for such a water dissipatable hot-melt adhesive. In addition, the present polyesters and polyesteramides have utility as hot-melt adhesives for paper, cloth, polyester film and other substrates. Because of their water dissipatability, the polymers of this invention have many uses not open to ordinary hot-melt adhesives. For example, it is possible to apply a water solution of the polymer to a substrate and allow the water to evaporate leaving an adherant coating of the polymer on the substrate. At some later time a bond can be formed by application of heat and pressure. Another application of this invention involves water-soluble films which are used for packaging detergents, dry bleach, and such products. With the use of the present polyester or polyesteramide, it is possible to put package and all in a washing machine whereupon the package disintegrates readily in hot water but is relatively unaffected by moisture at ordinary temperatures. Films of the present water-soluble polymer, particularly those in which the metal ion is $Mg^{++}$ or $Ca^{++}$, have such properties and are useful for this application. There are many applications for a surface coating material which can be easily applied to give a tough adherent protective coating which can later be easily removed. These new polymers have properties which make them useful for this purpose. Other uses for the polymers of this invention include uses for film splicing.

The following examples are submitted for a better understanding of this invention.

EXAMPLE 1

A 500-ml round-bottom flask equipped with a ground-glass bead, an agitator shaft, nitrogen inlet, and a sidearm is charged with 54.87 g (0.2828 moles) of dimethyl isophthalate, 0.34109 mole of 1,4-cyclohexanedimethanol, 15 g of Carbowax® 1540 (average molecular weight of 1500), 7.02 g (0.02373 moles) of dimethyl-5-sodiosulfoisophthalate, 0.22 g of sodium acetate, and 0.0662 grams of titanium isopropyl titinate (16% titanium). The flask is immersed in a Belmont metal bath at 200° C. for two hours with stirring under a nitrogen sweep. The temperature of the bath is then increased to 280° C. and the flask heated for 1 hour and 15 minutes under a reduced pressure of 0.5 to 0.1 mm of Hg. The flask is allowed to cool at room temperature and the copolyester is removed from the flask. The copolyester contains 3.26 mole % of Carbowax 1540. The inherent viscosity of the copolyester is 0.45. The polymer of Example 1 is dissolved at 10% concentration in water and the solution applied to Mylar ® film using an eye dropper. The film is air-dried and then oven-dried at 110° C. for 5 minutes. The polyester is adhered to the Mylar film in a circular dot pattern. The dots can not be flexed free of the film and the polyester dots can not be removed by scoring and subsequent pulling using the Scotch tape test.

Examples 2 through 6 show compositions and adhesive properties of water-dissipatable copolyesters containing less than 15 mole % poly(oxyethylene glycol) as Carbowax products with molecular weights ranging from 1000 to 4000. These are examples of copolyesters containing glycols of the general formula $H(OCH_2CH_2)_n$-OH where n is greater than 20. Example 7 shows a water-dissipatable copolyester in which the sulfonate salt moiety is lithium. Examples 8 and 10 show water-dissipatable copolyesters prepared from a metal sulfonate salt moiety and a poly(oxyethylene glycol) moiety of the general formula $H(OCH_2CH_2)_n$—OH where n is less than 20 and the mole percent poly(oxyethylene glycol) in the copolyester is less than 15.

Example 9 shows a water-dissipatable copolyester and adhesive properties prepared from a metal sulfonate moiety and poly(oxyethylene glycol) of the general formula is $H(OCH_2CH_2)_n$—OH where the glycols are mixed—one having a value of n less than 20, one having a value of n greater than 20, and the total mole percent of the two high molecular weight poly(ethylene glycol) in the copolyester is less than 15.

TABLE 1

| Ex. No. | Mole % Composition of Copolyester | | I.V. | Mol. Wt. of Poly-(oxyethylene Glycol) | Value of n | Wt. % of Poly-(ethylene Glycol) | Adhesion to Mylar | Adhesion to Polyester Yarn | Adhesion to Aluminum | Solubility in $H_2O$ |
|---|---|---|---|---|---|---|---|---|---|---|
| 2 | 92 | Dimethyl Isophthalate | 0.31 | 1500 | 34 | 15 | Excellent | Excellent | Excellent | 10% |
|  | 8 | Dimethyl-5-sodiosulfo Isophthalate | | | | | | | | |
|  | 3.26 | Carbowax ® 1540 | | | | | | | | |
|  | 96.74 | 1,4-cyclohexanedimethanol | | | | | | | | |
| 3 | 88 | Dimethyl Isophthalate | 0.38 | 4000 | 90 | 10 | Excellent | Excellent | Excellent | 10% |
|  | 12 | Dimethyl-5-sodiosulfo Isophthalate | | | | | | | | |
|  | 0.79 | Carbowax 4000 | | | | | | | | |
|  | 99.21 | 1,4-cyclohexanedimethanol | | | | | | | | |
| 4 | 82 | Dimethyl Isophthalate | 0.42 | 1000 | 22 | 14 | Excellent | Excellent | Excellent | >25% |
|  | 18 | Dimethyl-5-sodiosulfo Isophthalate | | | | | | | | |
|  | 4.73 | Carbowax 1000 | | | | | | | | |
|  | 99.27 | 1,4-cyclohexanedimethanol | | | | | | | | |
| 5 | 88 | Dimethyl Isophthalate | 0.35 | 1000 | 22 | 11 | Excellent | Excellent | Excellent | >10% |
|  | 12 | Dimethyl-5-sodiosulfo Isophthalate | | | | | | | | |
|  | 3.8 | Carbowax 1000 | | | | | | | | |
|  | 96.2 | 1,4-cyclohexanedimethanol | | | | | | | | |
| 6 | 83.5 | Dimethyl Isophthalate | 0.46 | 1000 | 22 | 16 | Excellent | Excellent | Excellent | >20% |
|  | 16.5 | Dimethyl-5-sodiosulfo-Isophthalate | | | | | | | | |
|  | 5.45 | Carbowax 1000 | | | | | | | | |
|  | 94.55 | 1,4-Cyclohexanedimethanol | | | | | | | | |
| 7 | 85 | Dimethyl- | 0.35 | 1000 | 22 | 15 | Excellent | Excellent | Excellent | >20% |

TABLE 1-continued

| Ex. No. | Mole % Composition of Copolyester | | I.V. | Mol. Wt. of Poly-(oxyethylene Glycol) | Value of n | Wt. % of Poly-(ethylene Glycol) | Adhesion to Mylar | Adhesion to Polyester Yarn | Adhesion to Aluminum | Solubility in H₂O |
|---|---|---|---|---|---|---|---|---|---|---|
| | 15 | terephthalate Dimethyl-5-lithosulfo Isophthalate | | | | | | | | |
| | 4.93 | Carbowax 1000 | | | | | | | | |
| | 95.07 | 1,4-Cyclohexanedimethanol | | | | | | | | |
| 8 | 85 | Dimethyl Isophthalate | 0.39 | 600 | 14 | 20 | Excellent | Excellent | Excellent | >20% |
| | 15 | Dimethyl-5-sodiosulfo Isophthalate | | | | | | | | |
| | 11.25 | Carbowax 600 | | | | | | | | |
| | 88.75 | 1,4-cyclohexanedimethanol | | | | | | | | |
| 9 | 88 | Dimethyl Isophthalate | 0.41 | 600 & 1500 | 14 & 34 | 5 & 10 | Excellent | Excellent | Excellent | >20% |
| | 12 | Dimethyl-5-sodiosulfo Isophthalate | | | | | | | | |
| | 1.08 | Carbowax 1500 | | | | | | | | |
| | 5.4 | Carbowax 600 | | | | | | | | |
| | 93.52 | 1,4-cyclohexanedimethanol | | | | | | | | |
| 10 | 88 | Dimethyl Isophthalate | 0.37 | 600 | 14 | 25 | Excellent | Excellent | Excellent | >20% |
| | 12 | Dimethyl-5-sodiosulfo Isophthalate | | | | | | | | |
| | 14 | Carbowax 600 | | | | | | | | |
| | 86 | 1,4-cyclohexanedimethanol | | | | | | | | |

Unless otherwise specified, all parts, percentages, ratios, etc., are by weight.

The invention has been described in detail with particular reference to preferred embodiments thereof, but it will be understood that variations and modifications can be effected within the spirit and scope of the invention.

I claim:

1. A textile fiber sizing composition comprising an aqueous dispersion containing from about 0.1 to about 50% by weight, based on the combined weight of polymer and water, of a linear, water-dissipatable polymer having carbonyloxy linking groups in he linear molecular structure wherein up to 80% on the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml. of the solvent, the polymer containing substantially equimolar proportions of acid equivalents (100 mole percent) to hydroxy and amino equivalents (100 mole percent), the polymer comprising the reaction products of (a), (b), and (c) from the following components or ester forming or ester-amide forming derivatives thereof;

(a) at least one difunctional dicarboxylic acid;
(b) from about 4 to about 25 mole percent, based on a total of all acid, hydroxyl and amino equivalents being equal to 200 mole percent, of at least one difunctional sulfomonomer containing at least one metal sulfonate group attached to aromatic nucleus wherein the functional groups are hydroxy, carboxyl or amino; and
(c) at least one difunctional reactant selected from a glycol or a mixture of a glycol and diamine having two —NRH groups, the glycol containing two —CH₂—OH groups of which from about 0.1 to less than 15 mole percent based on the total mole percent of hydroxy or hydroxy and amino equivalents, is a poly(ethylene glycol) having the structural formula:

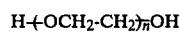

n being an integer of between 2 and about 500, and with the proviso that the mole percent of said poly(ethylene glycol) within said range is inversely proportional to the quantity of n within said range.

2. Composition according to claim 1 which includes at least one difunctional reactant selected from a hydroxycarboxylic acid having one —CR₂—OH group, an aminocarboxylic acid having one —NRH group, an amino-alcohol having one —CR₂—OH group and one —NRH or mixtures thereof, wherein each R is an H atom or an alkyl group of 1 to 4 carbon atoms.

3. Composition of claim 1 wherein the linear, water-dissipatable polymer is a polyester having primarily carbonyloxy linking units in the linear molecular structure.

4. Composition of claim 1 wherein said difunctional sulfomonomer is a dicarboxylic acid and constitutes about 8 mole percent to about 50 mole percent based on the sum of all acid equivalents.

5. Compositions of claim 1 wherein said difunctional sulfomonomer is a glycol and constitutes about 8 mole percent to about 50 mole percent based on the sum of all the hydroxy or hydroxy and amino equivalents.

6. Composition of claim 1 wherein said difunctional sulfomonomer is an aromatic dicarboxylic acid and the metal sulfonate group is attached to the aromatic nucleus thereof.

7. Composition of claim 1 wherein the metal of the sulfonate group is selected from the group consisting of Na, Li, K, Mg, Ca, Cu, Ni, Fe and mixtures thereof.

8. Composition of claim 1 wherein said difunctional sulfomonomer is isophthalic acid containing a metal sulfonate group attached to the aromatic ring.

9. Composition of claim 1 wherein said difunctional sulfomonomer is isophthalic acid containing a sodiosulfonate group.

10. Composition of claim 9 wherein said sodiosulfonate group is attached to the isophthalic acid in the 5-position.

11. Composition of claim 10 wherein the linear, water-dissipatable polyester comprises the reaction product of:
(a) at least 80 mole percent isophthalic acid;
(b) about 10 mole percent 5-sodiosulfoisophthalic acid; and
(c) diethylene glycol and
(d) a poly(ethylene glycol) having a molecular weight of between about 500 and about 5000.

12. Composition of claim 1 wherein component (a) is a mixture of isophthalic and adipic acid, and component (b) is sodiosulfoisophthalic acid.

13. Composition according to claim 1 wherein the major portion of component (a) is selected from therphthalic acid, isophthalic acid, ester forming derivatives of terephthalic or irophthalic acids, and mixtures thereof.

14. Composition according to claim 1 wherein component (c) is a mixture of a glycol and a poly(ethylene glycol) having the structural formula

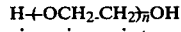

wherein n is an integer of between 2 and about 500.

* * * * *